March 14, 1933. H. H. V. STANLEY ET AL 1,900,957
FREE WHEEL COUPLING
Filed April 2, 1931
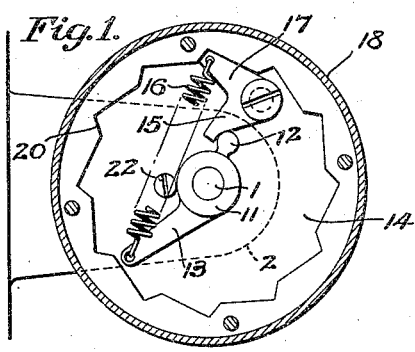
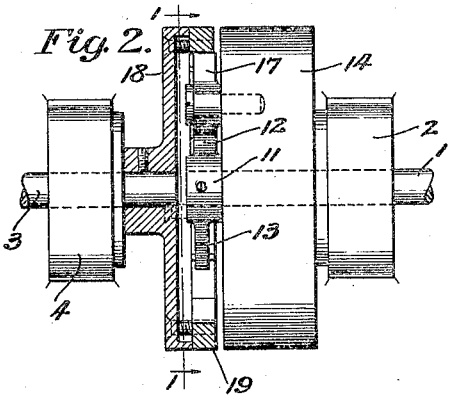
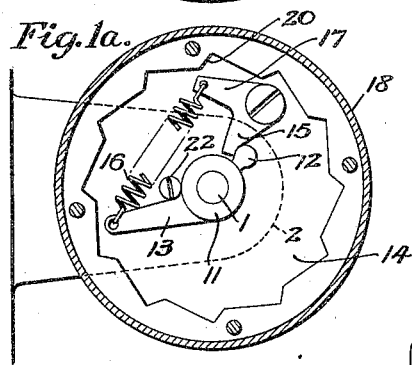
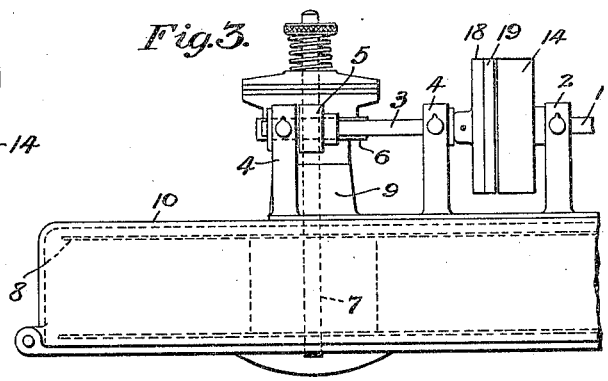
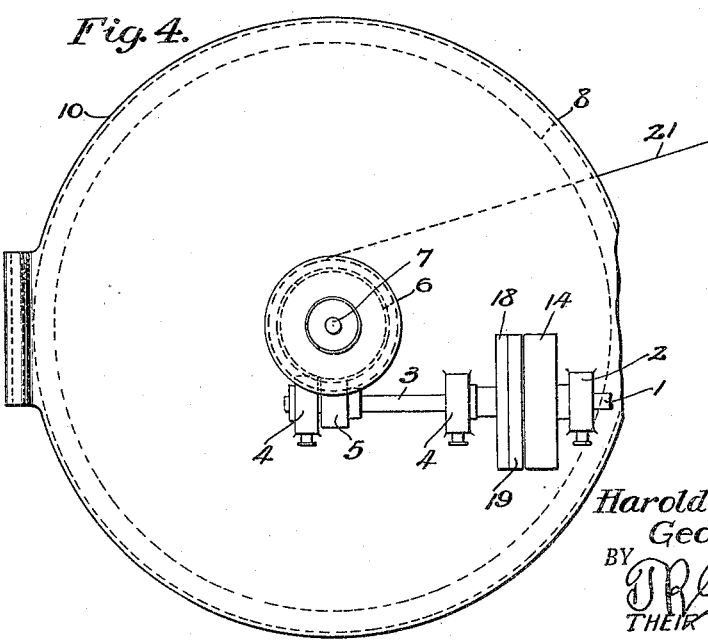
INVENTORS:
Harold H. V. Stanley,
George F. Clark,
BY
THEIR ATTORNEY.

Patented Mar. 14, 1933

1,900,957

UNITED STATES PATENT OFFICE

HAROLD HERBERT VERNON STANLEY, OF HAYES, AND GEORGE FREDERICK CLARK, OF WEST DRAYTON, ENGLAND

FREE-WHEEL COUPLING

Application filed April 2, 1931, Serial No. 527,316, and in Great Britain, April 15, 1930.

This invention relates to an improved coupling for use between a driving and a driven member and the object of the invention is to provide a coupling which enables drive to be imparted to the driven member whenever the driving member is rotated in one direction, while free wheel movement in both directions is permitted to the driven member when the driving member ceases to drive.

The invention consists in a free-wheel coupling wherein means are provided for imparting drive to the driven member when the driving member is rotated in one direction, said means permitting freedom of movement to the driven member in either direction when the driving member ceases to drive.

The invention is illustrated by way of example in the accompanying drawing in which Figs. 1 and 1a are views in sectional elevation of the free-wheel coupling, taken on the line 1—1 of Fig. 2, the two figures showing parts in different positions.

Fig. 2 is a view in elevation looking from the right in Fig. 1.

Figs. 3 and 4 are plan and elevation respectively on a smaller scale showing the invention applied to a film spool of a moving picture apparatus or of a sound recording or reproducing apparatus of the kind using strip records.

Referring to the drawing, 1 represents the driving shaft arranged for rotation in a bearing 2 and in a position where it is in axial alignment with a driven shaft 3 carried in a bearing 4. The end of the driven shaft carries a bevel wheel or gear 5 which engages a corresponding bevel wheel or gear 6 fixedly mounted on the shaft 7 which carries the film spool 8. The shaft 7 rotates in a bearing 9, and in the case illustrated the bearings 2, 4, and 9 are all carried upon a casing 10 surrounding the film spool 8, this casing 10 in turn being carried in any convenient manner on the frame of the apparatus.

A cam lever is fixedly mounted on the end of shaft 1 and comprises a boss 11 (Figs. 1 and 1a) having a short radial projection or cam 12 at one point on its periphery and a substantially tangential projection or lever 13 at a point on its periphery substantially diametrically opposite projection 12.

Also on the shaft 1 and adjacent the boss 11 is mounted a flywheel 14, this flywheel being mounted freely on the shaft 1. On the side face of the flywheel 14 nearest the boss 11 is pivotally mounted a two-armed pawl, one arm 15 of which lies in the plane of the short radial projection or cam 12 on the boss, 11 and engages therewith in a given position of the flywheel 14 relatively to shaft 1 and boss 11 (see Fig. 1). A light spring 16 is coupled to and between the second arm 17 of the pawl and the tangential projection or lever 13 formed on the boss 11.

On the end of shaft 3 adjacent shaft 1 is fixedly mounted a wheel 18 having a flange 19 (Fig. 2) the edge of which lies close to the face of the flywheel 14 so that the pawl arms 15, 17 and the boss 11 with the cam and lever projections 12 and 13 are surrounded by the flange 19. The flange 19 is formed with internal teeth 20 as shown in Figs. 1 and 1a to co-operate with the arm 17 of the pivoted pawl.

To rotate the spool 8 to wind up the film 21, it is necessary to rotate driven shaft 3 in a counter-clockwise direction in Figs. 1 and 1a. Accordingly the driving shaft 1 is rotated in a counter-clockwise direction in those figures. The flywheel 14 being free on the shaft 1, said flywheel 14 will by its inertia or mass, lag upon the shaft 1 until the short radial cam projection 12 on the boss 11 moves from the position shown in Fig. 1a to that shown in Fig. 1 where it engages the arm 15 of the pivoted pawl on the flywheel 14, whereupon the pawl is rocked slightly, against the light spring 16 which is coupled to and between the second arm 17 of the pawl and the tangential projection or lever 13 on the boss 11, and the end of the second arm 17 moves outwards into engagement with one of the teeth inside the flange 19 on wheel 18. The shaft 1, boss 11, flywheel 14, wheel 18 and shaft 3 now rotate as one and the film 21 is wound on the spool 8. When the drive of shaft 1 ceases, the pressure of the radial cam projection 12 against the arm 15 of the pivoted pawl is released, so that the pawl now moves under the pull of the spring 16 from engagement with the ratchet teeth 20 and into the position shown in Fig. 1a where the teeth 20 can pass the pawl 17, 15 without touching it. Thus the wheel 18 and the film spool 8 geared thereto are freed for rotation in either direction independently of shaft 1.

A stop pin 22 may be provided on the side of the flywheel 14 in a position spaced from the pivoted pawl 15, 17 and where said pin 14 is engaged by the tangential projection 13 on the boss 11, to ensure that the spring 16 between projection 13 and the arm 17 of the pawl is always under slight tension.

If necessary, an auxiliary friction brake device (not shown) may be provided to ensure that the flywheel 14 shall tend to lag on the driving shaft when the latter is driving.

By duplicating the pawl arms 15, 17 and the cam and lever projections 12, 13 and providing ratchet teeth 20 of suitable shape, an arrangement may be obtained whereby the wheel 18 and the film spool 8 can be driven in either direction by rotation of the driving shaft 1, or the film spool 8 may be rotated freely in either direction when the latter is stationary.

While in the above described arrangement reference has been made to the driving of the film spools, it will be understood that the device is capable of being applied to many kinds of apparatus, for example, in the transmission of a mechanically propelled vehicle.

Having now particularly described and ascertained the nature of our said invention and in what manner the same is to be performed, we declare that what we claim is:

1. In combination, a driving member, pawl actuating means carried by and rotatable with said driving member, a flywheel loosely mounted on said driving member, a pawl pivoted to said flywheel, resilient means connecting said pawl actuating means and said pawl, a driven member including a hub having ratchet teeth internally thereof, said pawl actuating means acting to urge said pawl into cooperative engagement with said ratchet teeth upon the rotation of said driving member, said flywheel acting to retard movement of said pawl relative to said pawl actuating means prior to the engagement of said pawl with said ratchet teeth, and means carried by said flywheel adapted to cooperate with said pawl actuating means upon the cessation of rotation of said driving member whereby said resilient means is maintained under tension.

2. Means for automatically coupling two independently rotatable members upon the rotation of one of said members comprising pawl actuating means and an inertia member including a pawl carried by one of said rotatable members, ratchet means carried by the other of said rotatable members and adapted to co-operate with said pawl upon engagement thereof with said actuating means to couple said rotatable members, resilient means connecting said pawl actuating means and said pawl for withdrawing said pawl out of engagement with said ratchet means upon the cessation of rotation of one of said members, and means carried by said inertia member for limiting clockwise movement of said pawl actuating means in response to said resilient means whereby said resilient means is maintained under tension.

3. An inertia actuated coupling device comprising a driving member, a cam lever carried thereby, a flywheel loosely mounted on said driving member, a pawl carried by said flywheel, a driven member, ratchet means carried by said driven member, said flywheel constituting an inertia member adapted to retard the rotation of said pawl with respect to said cam lever upon the rotation of said driving member to permit said cam lever to move said pawl into the path of said ratchet means, and resilient means connecting said cam lever and one arm of said pawl whereby said pawl is withdrawn out of engagement with said ratchet means upon the cessation of rotation of said driving member.

In testimony whereof, we have hereunto subscribed our names this 13th day of March, 1931.

HAROLD HERBERT VERNON STANLEY.
GEORGE FREDERICK CLARK.